(12) United States Patent
Ogimoto et al.

(10) Patent No.: US 6,667,146 B1
(45) Date of Patent: Dec. 23, 2003

(54) OPTICAL RECORDING MEDIUM AND REPRODUCING METHOD THEREFOR

(75) Inventors: Yasushi Ogimoto, Noda (JP); Kenji Nakanishi, Chiba (JP); Hiroshi Fuji, Soraku-gun (JP); Kunio Kojima, Nabari (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 09/632,655

(22) Filed: Aug. 4, 2000

(30) Foreign Application Priority Data

Aug. 17, 1999 (JP) .......................... 11-230204

(51) Int. Cl.$^7$ ................................. G11B 7/24
(52) U.S. Cl. ............... 430/270.13; 430/945; 428/64.4; 369/275.2; 369/275.4; 369/285
(58) Field of Search ................. 430/270.13, 945; 369/275.2, 275.4, 285; 428/64.4

(56) References Cited

U.S. PATENT DOCUMENTS

| | | | | |
|---|---|---|---|---|
| 5,314,734 A | * | 5/1994 | Nishida et al. | 430/945 |
| 5,529,864 A | * | 6/1996 | Tachibana et al. | 430/945 |
| 5,592,461 A | * | 1/1997 | Tsujioka et al. | 430/945 |
| 6,086,796 A | * | 7/2000 | Brown et al. | 430/271.1 |
| 6,136,457 A | * | 10/2000 | Miyano et al. | 428/693 |
| 6,181,650 B1 | * | 1/2001 | Ichihara | 369/13 |

FOREIGN PATENT DOCUMENTS

| | | | | |
|---|---|---|---|---|
| EP | 0195532 | * | 9/1986 | ............ 430/270.13 |
| EP | 0884723 | * | 12/1998 | |
| JP | 06-111369 | * | 4/1994 | |
| JP | 07-262617 | * | 10/1995 | |
| JP | 08-203122 | * | 8/1996 | |
| JP | 06164577 | | 11/1996 | ............ G11B/7/24 |
| JP | 08-315419 | * | 11/1996 | |

OTHER PUBLICATIONS

Machine translation of JP 07–262617.*
Tominaga et al., An approach for recording and readout beyond the diffraction limit with an Sb film, Appl. Phys. Lett., Vol 73(15) pp. 2078–2080 (Oct. 1998).*

* cited by examiner

*Primary Examiner*—Martin Angebranndt
(74) *Attorney, Agent, or Firm*—David G. Conlin; George W. Hartnell, III; Edwards & Angell, LLP (57) ABSTRACT

An optical recording medium includes a recording layer and a mask layer on a substrate. The mask layer is formed of a material whose light transmittance is decreased by light irradiation and is increased by heating.

22 Claims, 9 Drawing Sheets

OPTICAL RECORDING MEDIUM AND REPRODUCING METHOD THEREFOR

CROSS-REFERENCE TO RELATED APPLICATION

This application is related to Japanese Patent Application No. HEI 11 (1999)-230204 filed on Aug. 17, 1999, whose priority is claimed under 35 USC §119, the disclosure of which is incorporated by reference in its entirety.

BACKGROUND OF THE INVENTION

1. Field of the Invention

The present invention relates to an optical recording medium from which information is reproduced by use of light or near field light and a reproducing method therefor.

2. Description of Related Art

In recent years, optical memories typified by DVDs (digital-versatile-disks) and magneto-optical disks have been becoming remarkably high density. Recording density over several gigabits per square inch has already been realized. However, mass-storage devices with further high density are still demanded as storage devices for so-called home servers intended to store moving pictures and others.

In the optical memories, the recording density is basically determined by the diameter of a light spot (more precisely, a temperature distribution formed by a light spot). Accordingly, with the intention of forming a smaller light spot (the light spot is defined as an area having a light intensity of $1/e^2$ or higher), blue-violet lasers are being developed for shortening the wavelength of light sources and the NA (numerical aperture) is being enlarged by SILs (solid-immersion-lenses).

On the other hand, besides such techniques for reducing the light spot diameter, a super resolution technique using a mask layer is now being vigorously studied with a view to recording on and reproducing from a bit smaller than the light spot.

The super resolution technique using a mask layer is a technique of reproducing a bit smaller than the light spot without cross talk by providing an aperture smaller than the light spot with use of a temperature distribution or a light amount distribution formed by light irradiation of the mask layer. For example, Japanese Unexamined Patent Publication No. HEI 8(1996)-7333 discloses "an optical information medium using a mask layer which changes its reflectance to reproduction light by being heated to or over a transition temperature, which is within the range of 200 to 450° C., by light irradiation and caused thereby to make a crystal-to-crystal transition." In addition to that, the publication also states that a breaching layer whose light transmittance increases with an increase in the intensity of incident light and mask layers using non-linear optical materials such as glass and the like, organic films and metals with low-melting temperature.

Also proposed is a high-density recording with near field light using a mask layer. For example, according to Applied Physics Letter, Vol.73, No.15, (1998), pp.2078 to 2080, reproduction with help of near field light can be realized by using an antimony film as a mask layer and forming an aperture smaller than a light spot.

In signal reproduction by the super resolution technique using such mask layers, it is required to satisfy high reliability: (1) degradation does not occur when the aperture is formed in a reproducing process; (2) there are no limit to the number of repetitions, and the like. Accordingly, it is important to decide what principle should be used for forming the aperture on the mask layer.

However, the mask layers according to the above-explained conventional techniques have problems in reliability such as (1) degradation by the reproducing process owing to high aperture-forming temperature, (2) a limited number of repetitions owing to a phase change involving melting or owing to the use of an organic film, and the like. Further, as the size of the aperture decreases, a signal to noise ratio (S/N) becomes worse. Especially, in the case where the near field light is utilized, the S/N declines remarkably so that it becomes hard to reproduce signals.

SUMMARY OF THE INVENTION

In view of the above-described problems, an object of the present invention is to provide an optical recording medium and a reproducing method therefor which allow signals to be reproduced from a bit smaller than the light spot with a good S/N and allow high-density recording and reproduction without reducing the size of the light spot.

The inventors of the present invention have paid attention not only to an aperture formed at a central part in the light spot but also to its peripheral region (a peripheral part in the light spot) for realizing an optical recording medium and its reproducing method which allow super resolution reproducing with a superior S/N.

For achieving the above-mentioned object, the present invention provides an optical recording medium comprising a recording layer and a mask layer on a substrate, wherein the mask layer is formed of a material whose light transmittance is decreased by light irradiation and is increased by heating.

The invention is also characterized in that, in the above-described optical recording medium, the mask layer has a threshold light transmittance with respect to the amount of light applied to the mask layer and the light transmittance at a central part in a light spot formed by the applied light is set to be higher than the light transmittance at a peripheral part in the light spot and lower than the light transmittance at a part of the mask layer which is not irradiated with light.

The invention is also characterized in that, in the above-described optical recording medium, the mask layer has a threshold electrical resistivity with respect to the amount of light applied to the mask layer and the electrical resistivity at the central part in the light spot formed by the applied light is set to be higher than the electrical resistivity at the peripheral part in the light spot and lower than the electrical resistivity at a part of the mask layer which is not irradiated with light.

Further, the invention is characterized in that a change in the light transmittance and the electrical resistivity of the mask layer is induced by a metal-to-insulator transition.

In another aspect, the present invention provides a reproducing method for an optical recording medium comprising, when information is reproduced with irradiating with light an optical recording medium provided with a recording layer and a mask layer on a substrate, the mask layer having a light transmittance which is decreased by light irradiation and increased by heating, setting the amount of light in a light spot formed by light applied to the mask layer to or above a threshold amount of light at which the mask layer transits from an insulator to a metal and setting the temperature at a central part in the light spot to or above a threshold temperature at which the mask layer transits from a metal to an insulator.

The present invention also provides a reproducing method for an optical recording medium comprising, when information is reproduced with irradiating with near field light an optical recording medium provided with a recording layer and a mask layer on a substrate, the mask layer having a light transmittance which is decreased by light irradiation and increased by heating, enhancing the near field light generated via an aperture at a central part of a light spot by means of an annular region having a low electrical resistivity formed around the aperture.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The optical recording medium and its reproducing method of the present invention is now explained in the following order:

(a) Principle of Aperture Formation;
(b) Principle of Improvement of S/N;
(c) Principle of Enhancement of S/N in Near Field Light Reproducing; and
(d) Reproducing Example.

(a) Principle of Aperture Formation

Figure 1:
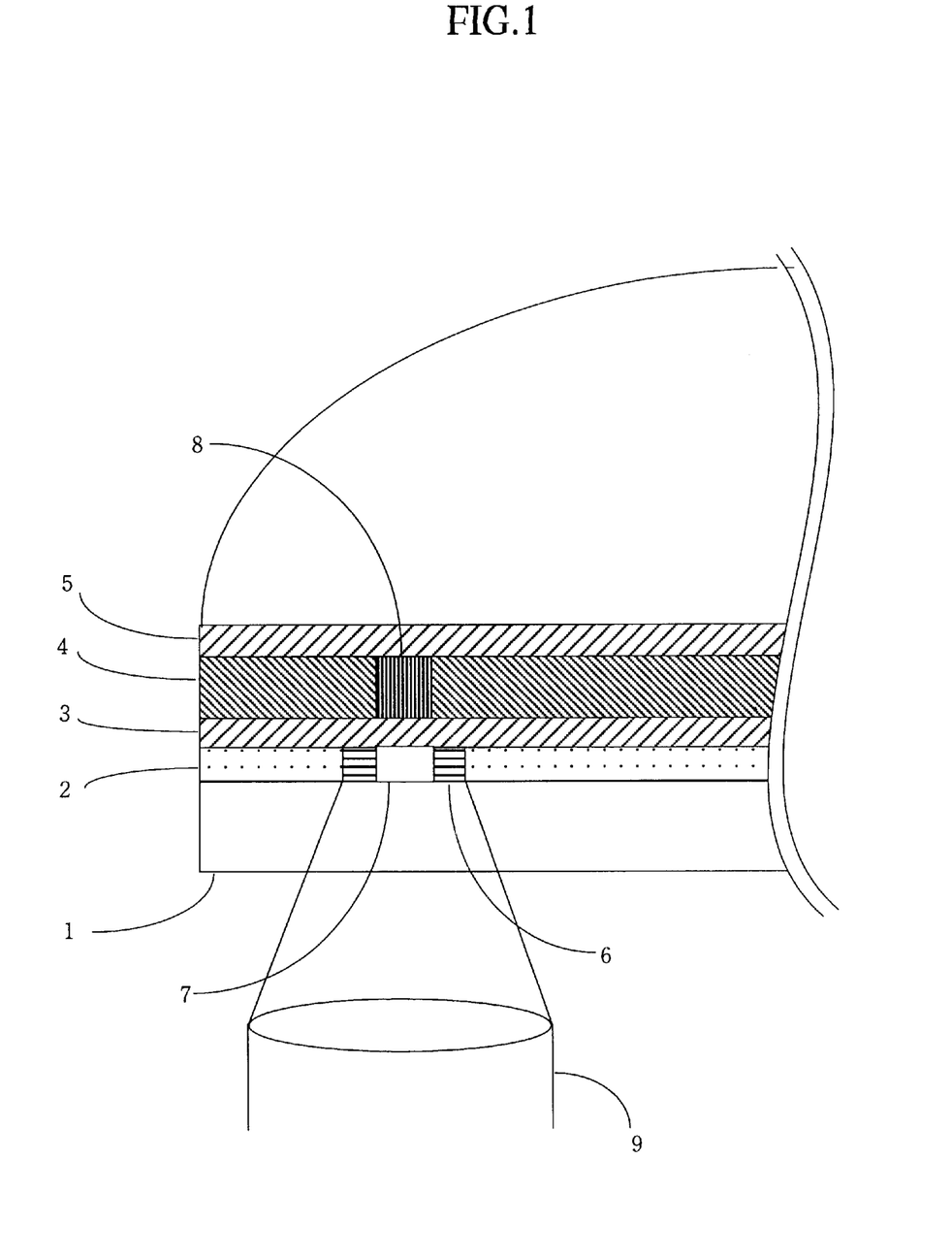
FIG. 1 is a schematic sectional view illustrating an optical recording medium and a principle for forming an aperture in accordance with the present invention.

FIG. 1 is a schematic sectional view illustrating the optical recording medium and the principle of aperture formation of the present invention. First, the construction of a recording medium 9 is explained. In the recording medium 9, a mask layer 2 is formed on a transparent substrate 1, and next, a lower protective layer 3, a recording layer 4 and an upper protective layer 5 are formed. Another protective layer may be formed between the transparent substrate 1 and the mask layer 2. Also it is needless to say that a reflection film customarily used may also be formed.

Onto this recording medium 9, a laser beam is applied from a transparent substrate side through a light pickup 10. It may be considered that the amount of light exhibits a normal distribution within a light spot formed on the mask layer 2. Generally, an aperture is formed by increasing the light transmittance of the mask layer 2 at a central part 7 in the light spot by utilizing the light amount distribution or temperature distribution in the light spot. In a conventional mask layer 2, a peripheral part 6 in the light spot at this time is regarded as being equal to a region not irradiated with light (region where the light transmittance is low).

The present invention is characterized by using the mask layer 2 whose light transmittance is high also in the region not irradiated with light. More particularly, within the light spot, light irradiation causes the light transmittance to decrease so that a mask is formed, and as the central part 7 in the light spot is further heated, an aperture is formed. Thus a peripheral part 6 in the light spot acts as a mask as annularly surrounding the aperture. According to the present invention, the aperture and the mask are characteristically formed in a self-aligning manner.

Now explained is the principle of this self-aligning formation of the aperture and the mask.

Figure 2A:
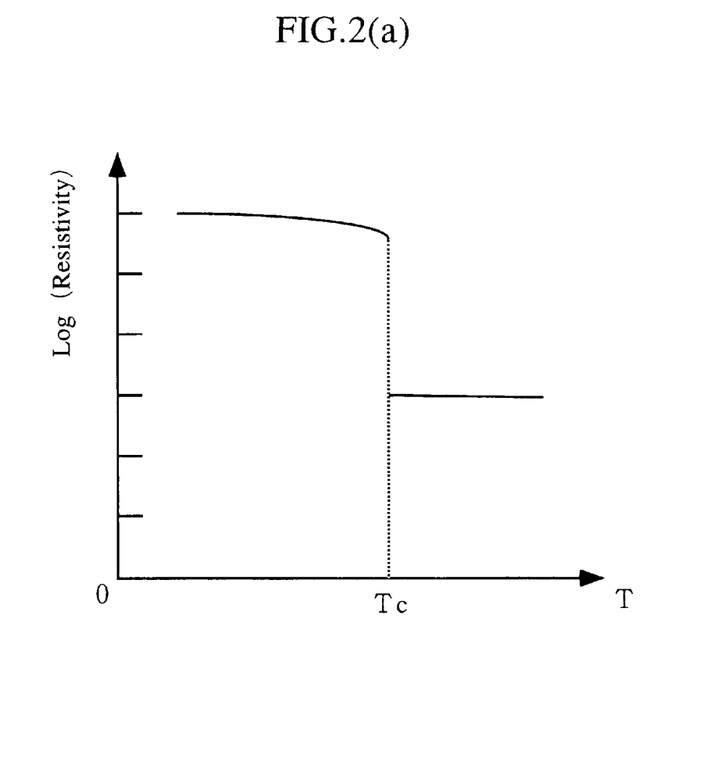
FIGS. 2(a) and 2(b) show a relationship between temperature and resistivity and a relationship between temperature and light transmittance, respectively, in a mask layer 2.
Figure 2B:
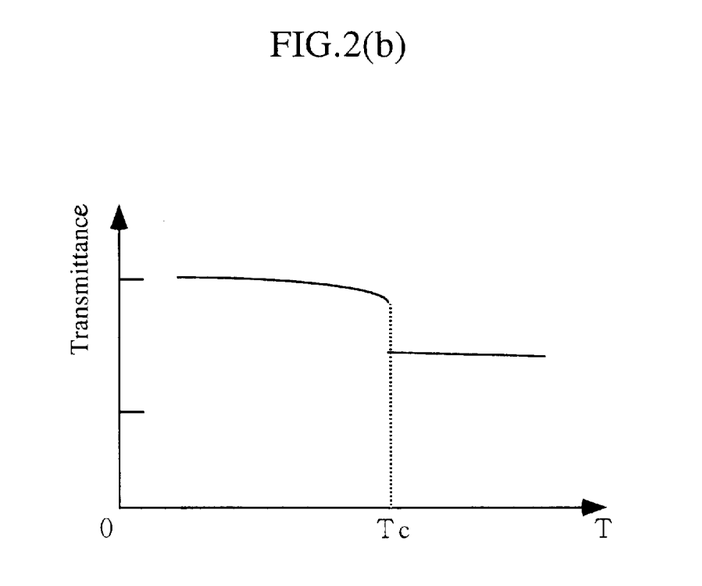

FIGS. 2(a) and 2(b) show a relationship between temperature and resistivity in a mask layer 2 and a relationship between temperature and light transmittance, respectively. The temperature is plotted in abscissa in both the figures. A logarithmic resistivity is plotted in ordinate in FIG. 2(a) and the light transmittance is plotted in ordinate in FIG. 2(b). As shown in FIG. 2(a), the mask layer 2 exhibits an insulating phase having an extremely high resistivity at temperatures lower than a transition temperature (referred to as Tc hereinafter), and holds its insulating property at temperatures higher than Tc though the resistivity shows a fall. Referring to FIG. 2(b), a decrease in the light transmittance is not so large. The mask layer 2 exhibits a high light transmittance even where it is not irradiated with light.

The mask layer 2 is formed using a material exhibiting an insulator-to-metal transition with light irradiation at a temperature lower than Tc. For example, $Pr_{1-X}Ca_XMn_{1+Y}O_3$ (X is 0.3 to 0.5, Y is 0.0 to 0.1) is known as an oxide of perovskite structure. With materials of this kind, Tc can be changed continuously from around room temperature to around 100° C. by increasing a Ca dope amount X or a Mn amount Y.

Also usable are $Pr_{1-X}Ca_XMn_{1+Y}O_3$ doped with Sr, $La_{1-X}Ca_XMn_{1+Y}O_3$ (X is 0.6 to 0.7, Y is 0.0 to 0.1), $(Pr_{1-X}La_X)_{0.7}Ca_{0.3}Mn_{1+Y}O_3$ (X is 0.1 to 0.5, Y is 0.0 to 0.1) and $(Pr_{1-X}Ba_X)_{0.7}Ca_{0.3}Mn_{1+Y}O_3$ (X is 0.1 to 0.5, Y is 0.0 to 0.1).

Figure 3A:
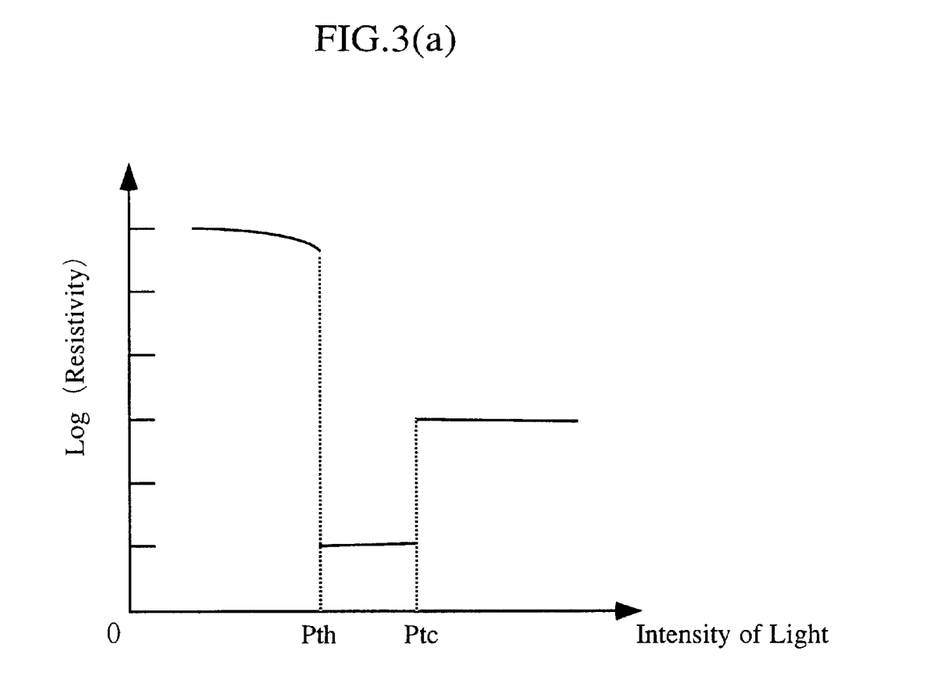
FIGS. 3(a) and 3(b) show a relationship between the amount of light applied to the mask layer 2 and resistivity and a relationship between the amount of the applied light and light transmittance, respectively.
Figure 3B:
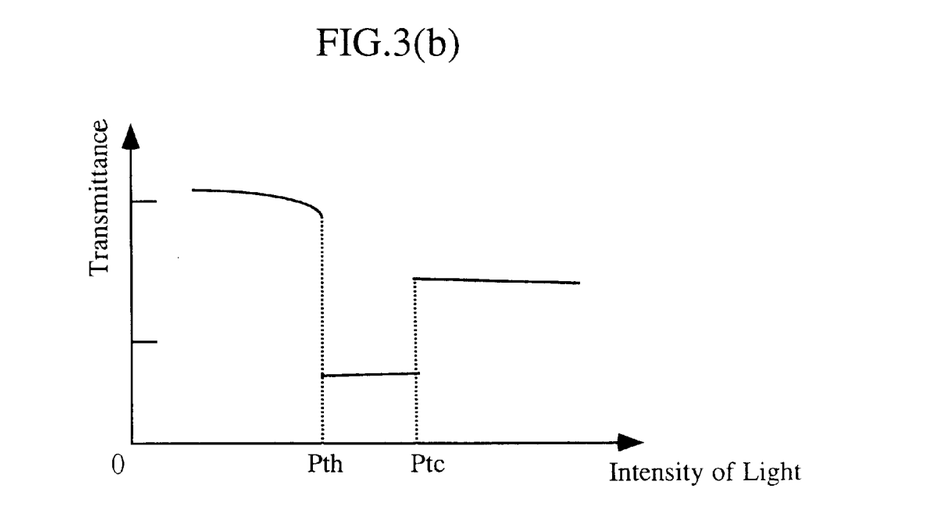

FIGS. 3(a) and 3(b) show a relationship between the amount of light applied to the mask layer 2 and resistivity and a relationship between the amount of the applied light and light transmittance, respectively. The amount of light is plotted in abscissa in both the figures. A logarithmic resistivity is plotted in ordinate in FIG. 3(a) and the light transmittance is plotted in ordinate in FIG. 3(b). As shown in FIG. 3(a), as the amount of light is increased, the resistivity drops abruptly by five to six digits at Pth. That is, transition from an insulator to a metal is caused by light irradiation. As the amount of light is further increased, the resistivity of the mask layer 2 rises abruptly by two to three digits at Ptc.

Figure 4:
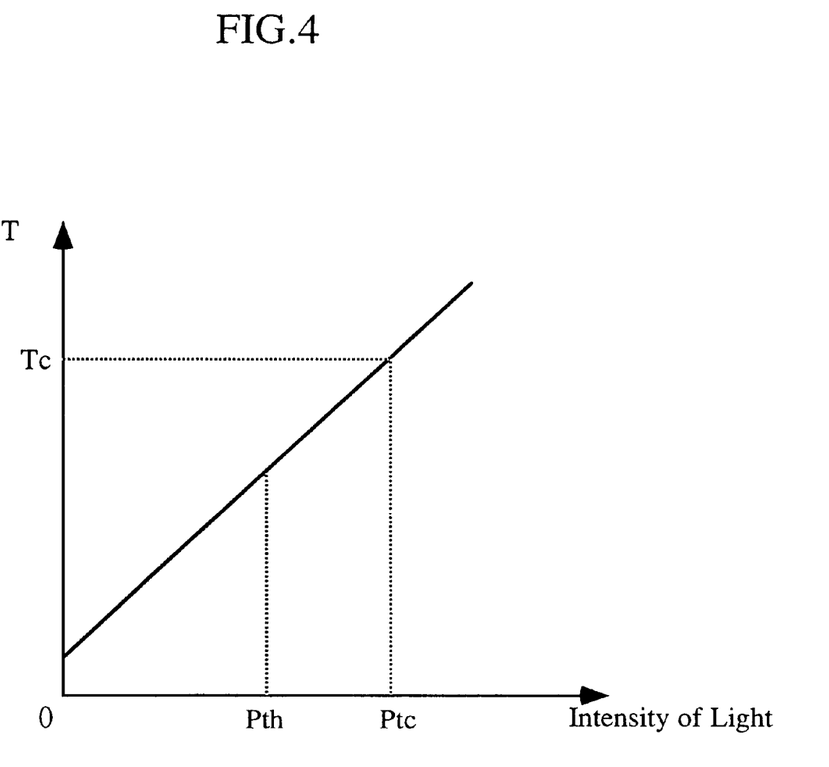
FIG. 4 shows a relationship between the amount of light applied to the mask layer 2 and the temperature of the mask layer 2.

As understood from comparison of FIGS. 2(a) and 2(b) with FIGS. 3(a) and 3(b), simple temperature rise only induces transition from an insulator phase with a high resistivity to an insulator phase with a slightly lower resistivity at Tc, while light irradiation induces transition twice, i.e., from an insulator to a metal and then from the metal to an insulator, by increase in the amount of light. The reason for these transitions is explained with reference to FIG. 4. FIG. 4 shows a relationship between the amount of light applied to the mask layer 2 and the temperature of the mask layer 2, with the amount of light plotted in abscissa and the temperature plotted in ordinate. As understood from FIG. 4, the temperature of the mask layer 2 increases with increase of the amount of light. Where the amount of light is higher than Ptc, the temperature of the mask layer 2 exceeds Tc. That is, the second transition from metal to insulator takes place by temperature rise. The reason may be that, because the temperature of the mask layer 2 exceeds Tc owing to increase of the amount of light, the metal phase generated as a result of the insulator-to-metal transition by light irradiation disappears and the insulator phase appears on the higher temperature side of Tc, as shown in FIGS. 2(a) and (b).

On the other hand, as shown in FIG. 3(b), the change of the light transmittance corresponds to the change of the resistivity. The light transmittance decreases in correspondence with the transition to the metal phase by application of light in an amount of Pth or more. At an amount of light of Ptc or more, the light transmittance increases again. Thus, the mask layer 2 has two threshold light amounts Pth and Ptc, at which the resistivity and the light transmittance change abruptly.

For example, provided that the central part in the light spot has a light transmittance A, the light transitivity at the peripheral part in the light spot is preferably 0.2 to 0.4 times as large as the light transmittance A. Further, the light transmittance is preferably 1.1 to 1.2 times as large as the light transmittance A where the mask layer is not irradiated with light.

Next, explanation is given as to what change occurs in the light spot when a light beam is applied to the recording medium 9 having the above-described mask layer 2 formed thereon.

Figure 5:
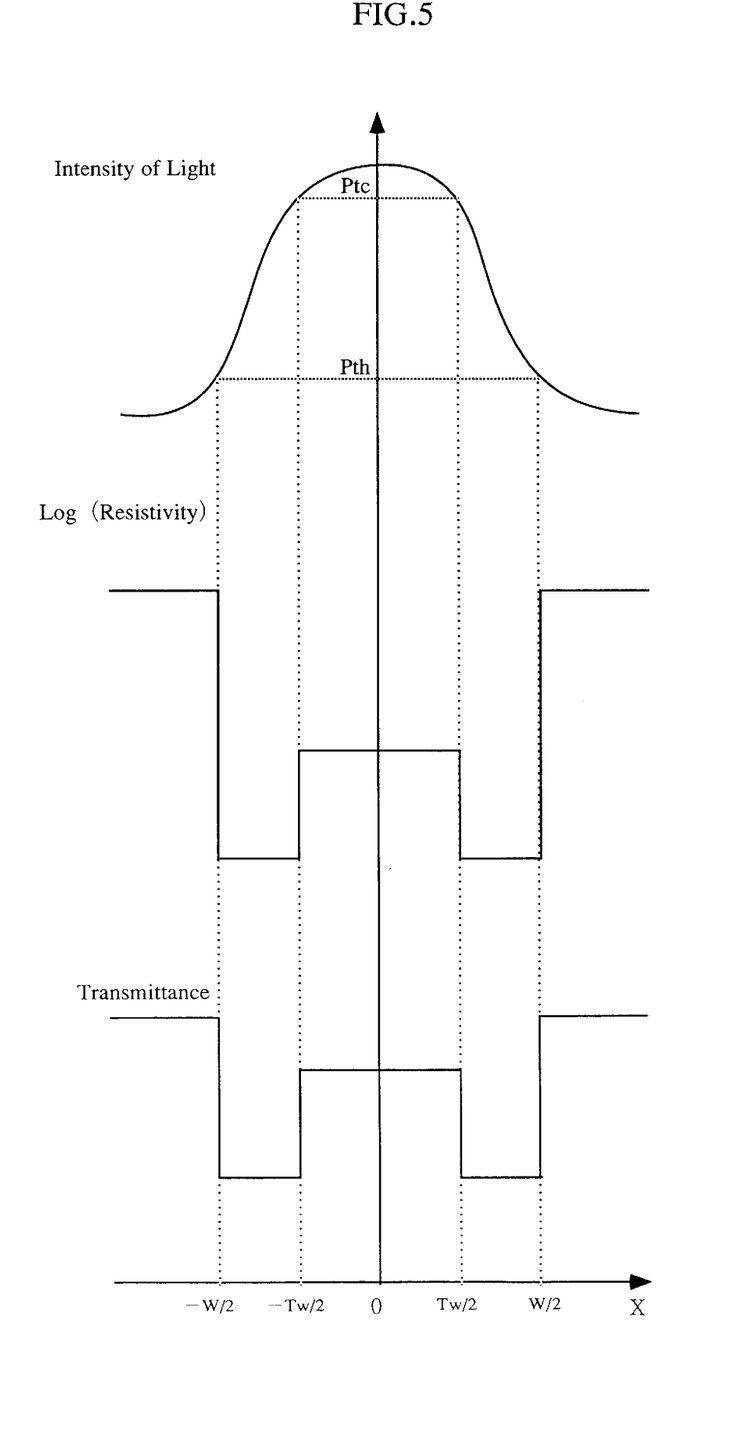
FIG. 5 is a schematic view illustrating a light amount distribution in a light spot formed by light applied onto a recording medium 9 by a light pickup 10.

FIG. 5 illustrates a light amount distribution in the light spot formed by light applied onto the recording medium 9 by the light pickup 10. In FIG. 5, the abscissa represents the direction of a track width X (corresponding to a radial direction of a disk) and the ordinate represents the amount of light with the origin representing the center of the light spot. For simplicity of explanation, it is presumed that the light spot is circular and that the light intensity distribution in the light spot is a normal distribution. Pth indicates the threshold light amount at which the mask layer transits from the insulator phase to the metal phase. Ptc indicates the threshold light amount at which the temperature of the mask layer 2 exceeds Tc and the mask layer 2 transits from the metal phase to the insulator phase on the higher temperature side of Tc. In FIG. 5, both the changes of the resistivity and the light transmittance, which correspond to the light amount distribution, are shown on the same abscissa. The central part 7 in the light spot corresponds to a region receiving an amount of light of Ptc or more and is represented by X=−Tw/2 to Tw/2. The peripheral part 6 in the light spot corresponds to a region receiving an amount of light of Pth or more and Ptc or less, and is represented by X=−W/2 to −Tw/2 and Tw/2 to W/2. Here, W is the diameter of the light spot and Tw is the diameter of a region within the light spot where temperature is Tc or higher.

Paying attention to the nature of the central part 7 and the peripheral part 6 in the light spot, it is understood that the central part 7 in the light spot, whose light transmittance is high, is surrounded by the peripheral part 6 in the light spot whose light transmittance is low and that the light transmittance is high again outside the peripheral part 6 in the light spot.

Therefore, by applying a light beam in such a manner that the amount of light in the light spot is not lower than the threshold light amount Pth (at which the mask layer 2 transits from the insulator to the metal) and the temperature in the central part 7 in the light spot is not lower than the threshold temperature Tc (at which the mask layer 7 transits from the metal to the insulator), that is, the light amount distribution becomes Ptc or more in the central part 7 in the light spot, the central part 7 in the light spot acts as an aperture and the peripheral part 6 in the light spot acts as a mask. Thus, it has become possible to reproduce signals from a bit smaller in diameter than the light beam without cross talk (the super resolution reproducing).

Figure 6:
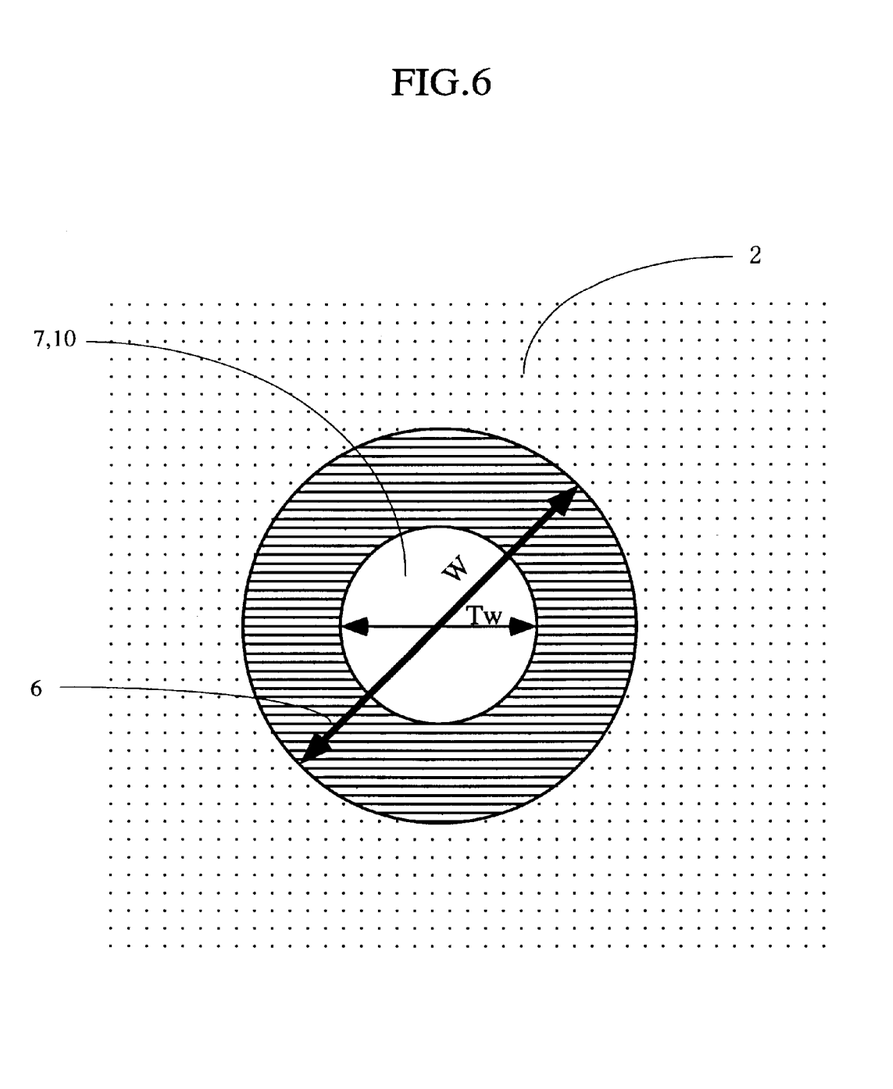
FIG. 6 is a plan view illustrating a relationship between the aperture and a mask in the mask layer 2.

This is explained again with reference to a plan view of the mask layer 2 shown in FIG. 6. In the figure, the transition to the metal phase by light irradiation does not take place in a dotted region. Reference symbol W denotes the diameter of the peripheral part 6 (mask) in the light spot which is represented by a shaded annular region. Reference symbol Tw denotes the diameter of the central part (aperture) 7 in the light spot which is represented by a white circle.

The diameter of the peripheral part (mask) 6 in the light spot can be extended or reduced within the limits of the diameter of the light spot by adjusting Pth and Ptc. The diameter of the central part (aperture) 7 in the light spot can also be controlled by adjusting Ptc.

As detailed above, by use of the mask layer of the present invention, it is possible to form the aperture and the mask in self-alignment without reducing the size of the light spot and realize an optical recording medium and a reproducing method therefor which enable high-density reproduction without cross talk.

Also the abrupt changes of the resistivity and light transmittance in the mask layer 2 of the present invention are considered to be generated by an abrupt metal-to-insulator transition. Since the metal-to-insulator transition is a phase transition between a solid phase and a solid phase, high reliability is achieved in repeatability. Further, since Tc can be set sufficiently low (higher than room temperature) as already explained, the aperture can be formed at a low light power and therefore, there are no problems of degradation by the reproducing process and the like.

Furthermore, this metal-to-insulator transition occurs at an extremely high speed (nsec order or faster), the mask layer 2 characteristically presents a sufficiently fast response speed as a mask 2 for an optical memory which is required to provide high-speed recording and reproduction.

(b) Principle of Improvement of S/N

A drop in S (signal volume) itself owing to a reduced bit size is a cause of a S/N drop which makes a problem in the super resolution technique using mask layers, but the inventors have found out that N (noise) generated by use of the mask layers is greatly responsible for a drop in the S/N.

As described in the prior-art section, there are used glass mask layers of high light transmittance and metal mask layers of low light transmittance. With a glass mask layer of high light transmittance, light reflected by the recording layer via the mask results in an increase in noise, while with a metal mask layer of low light transmittance, light reflected by the surface of the mask increases noise.

Now explanation is given as to why the noise resulted from the above-mentioned causes can be reduced in the mask layer of the present invention.

Figure 7:
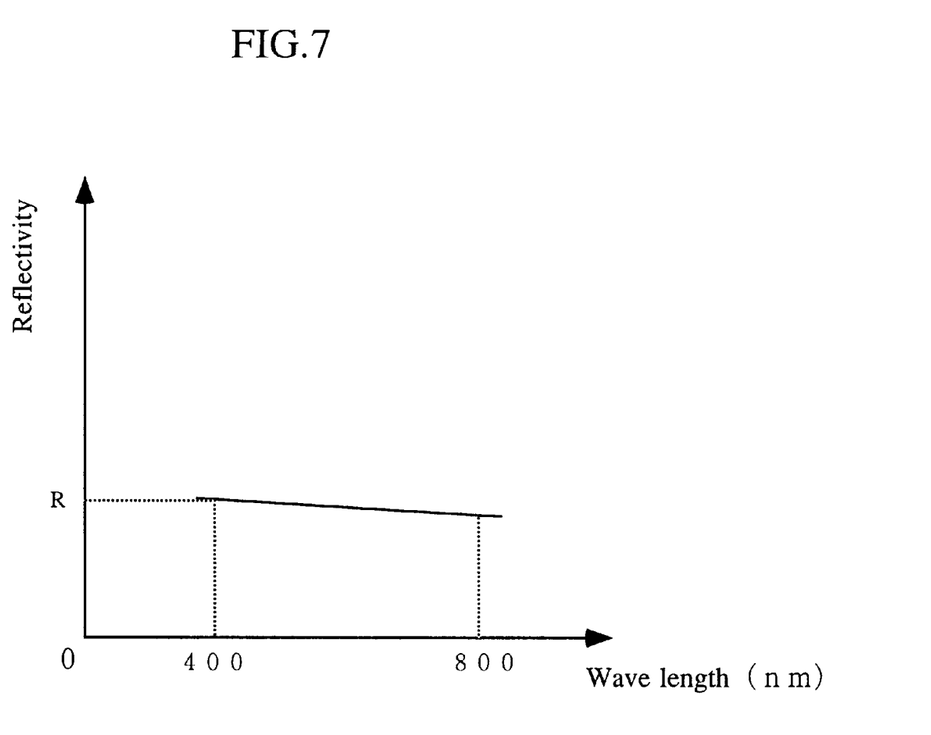
FIG. 7 shows a wavelength dependency of reflectance in a mask portion having transited to a metal phase by light irradiation.

FIG. 7 shows reflectance in the mask part having transited to the metal phase by light irradiation with the wavelength of light plotted in abscissa and the reflectance in ordinate. The reflectance is represented by R. The wavelength of semiconductor lasers used in optical recording ranges mainly from 400 to 780 nm. Within this wavelength range, the mask part exhibits a low, constant reflectance. For example, the above-mentioned $Pr_{1-x}Ca_xMn_{1+y}O_3$ presents a sufficiently low, constant reflectance of 20% or less. In the annular mask part surrounding the aperture, the light transmittance is low as a matter of course, but the reflectance is also sufficiently low as compared with transition metals.

In the metal phase transited by light irradiation, not only the light transmittance but also the reflectance is low. Thus, reduced is light reflected from the recording layer and from the surface of the mask layer that causes noise in the mask layer. Therefore, the S/N can be improved. Further, the control of the size of the mask part by adjusting the two threshold light amount Pth and Ptc is also suitable for reducing the amount of unnecessary reflected light in the light spot and effective for improving the S/N. Further, since the reflectance in the mask part is constant within the wavelength range of the semiconductor lasers used in optical recording, the mask layer is also useful as a mask layer for optical recording devices using different wavelengths.

(c) Principle of Enhancement of S/N in Near Field Light Reproducing

Next, explanation is given of the principle of enhancement of the S/N in near field light optical recording and reproducing to which a drop of the S/N is a more serious problem. In the above (b) Principle of Improvement of S/N, explained is the means of improving the S/N mainly by reducing noise. However, in optical recording using near field light, ultra high density recording is expected and the bit size is assumed to be as small as 100 nm or less. Accordingly, the signal volume itself becomes smaller. In addition to that, the efficiency in generating the near field light (for example, represented by the intensity of the near field light to the intensity of incident light) is significantly low, about $10^{-3}$, and furthermore, the intensity of detected near field light is still smaller than that. For these reasons, to amplify the signal (S) itself is inevitable for realizing the near field light recording.

Figure 9A:
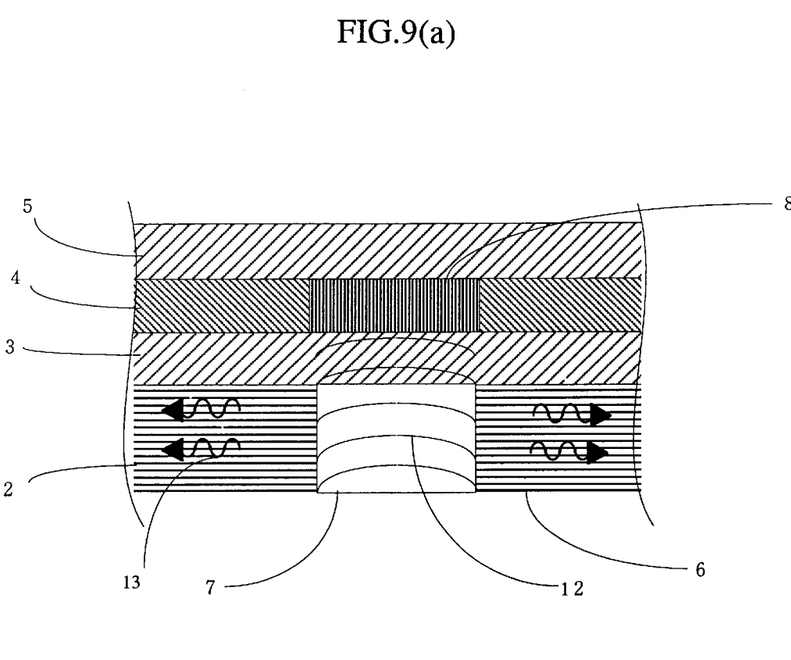
FIG. 9(a) is an enlarged schematic sectional view illustrating a conventional example of optical recording using near field light and FIG. 9(b) is a schematic plan view of FIG. 9(a).
Figure 9B:
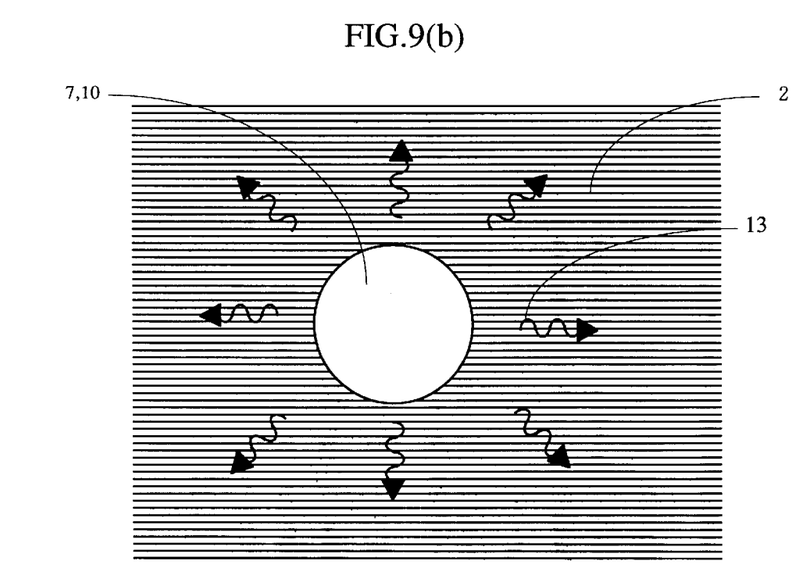

First, a conventional example of signal reproduction using the near field light is explained with reference to FIGS. 9(a) and 9(b). Here, for simplicity of explanation, FIG. 9(a) shows an enlarged schematic sectional view of a mask layer 2, a lower protective layer 3, a recording layer 4 and an upper protective layer 5 as a recording medium 9. FIG. 9(b) shows a plan view of the mask layer 2.

A phase-change material $Ge_2Sb_2Te_5$ is used for the recording layer 4 and an antimony film is used for the mask layer 2. When the antimony film is irradiated with light by laser, a high-temperature part at a central part 7 in a light spot melts to change from an opaque state to a transparent state. Thereby an aperture having a size equal to or smaller than diffraction limit of light is generated in the mask layer 2 and a recording bit 8 in the recording layer 4 is read. At this time, the thickness of the lower protective layer 3 is so set that the near field light 12 generated via the aperture reaches the recording layer 4. Thereby it is said that a recording mark of 100 nm or less can be reproduced.

However, since a reproduced signal thus read out is extremely small for the above-described reason, it is a great problem in realizing high-density recording although a very small bit can be formed.

For enhancing the near field light, it may be considered to utilize amplification by resonance between a laser light and a metal as well known in infrared absorption test and the like. However, so far as used is a mask structure in which a mask portion surrounding the aperture extends uniformly as described in the conventional example, elementary excitation 11 cannot be generated, or if it is generated, excitation efficiency is so low that the generated elementary excitation 11 is scattered and lost in a uniform mask region. Therefore, it is considered that the near field light cannot be amplified.

Figure 8A:
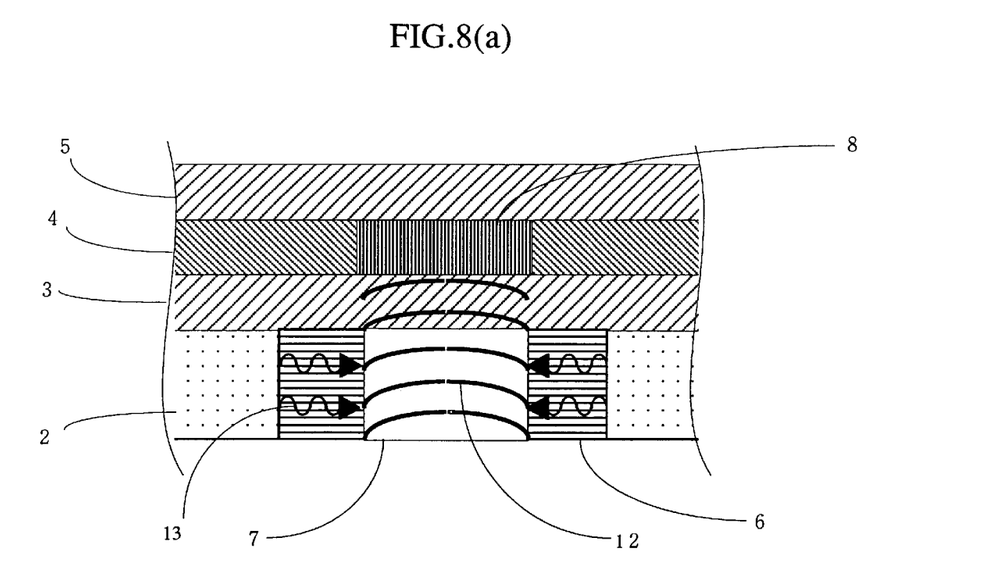
FIG. 8(a) is an enlarged schematic sectional view illustrating the principle of amplification of near field light in accordance with the present invention and 8(b) is a schematic plan view of FIG. 8(a)
Figure 8B:
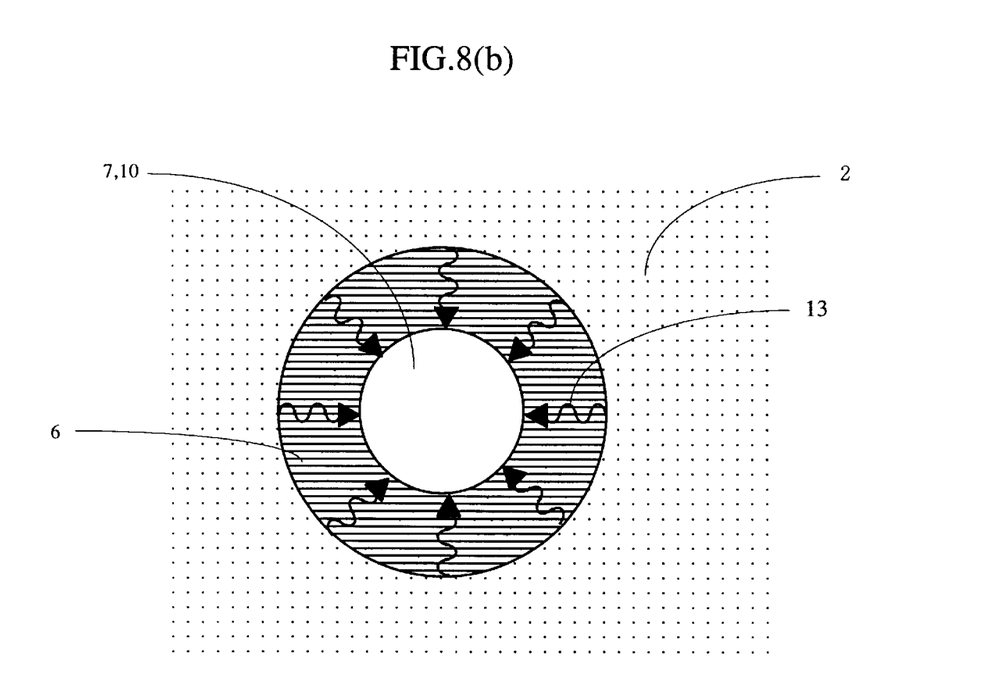

Next, the principle of near field light amplification by the mask layer 2 of the present invention is explained as follows. As FIGS. 9(a) and 9(b), FIG. 8(a) shows an enlarged schematic sectional view of a mask layer 2, a lower protective layer 3, a recording layer 4 and an upper protective layer 5 as a recording medium 9, and FIG. 8(b) shows a plan view of the mask layer 2.

Here, the mask layer 2 of the present invention is significantly different from the conventional example in that the mask part formed in the mask layer 2 is formed in an annular shape surrounding the aperture but not extended uniformly. It is understood that the thus formed aperture and mask have such construction that the resistivity of the aperture is high, the annular low-resistivity region (mask) surrounds the aperture and the resistivity is high outside the annular low-resistivity region, as shown in FIG. 5. That is, the mask part formed of the peripheral region 6 in the light spot is sandwiched by the high-resistivity region inside and the high-resistivity region outside. Also, by use of an insulating film as the lower protective film and use of an insulative transparent substrate 1, the low-resistivity region is formed annularly.

By thus forming the low-resistivity region, i.e., a metal region, in an annular shape, the elementary excitation 11 such as plasma can be generated by resonance with the laser light in the mask part. The mode of this elementary excitation 11 is not clearly known, but a large electromagnetic field localized by being enclosed in this annular mask region interacts with the near field light formed via the aperture and thereby amplifies the intensity of the near field light remarkably.

By thus forming the mask region annularly as surrounds the aperture, it is possible to utilize the localized electromagnetic field excited by the annular mask part for amplifying the near field light and enhance the S/N in reproduction using the near field light. Therefore, high-density optical recording can be realized.

Further, this localized electromagnetic field is considered to be dependent upon the size of the annular region. In the present invention, since the mask region can be adjusted by varying Pth, Ptc and the thickness of the mask layer 2, the mask can be designed to be suitable for the amplification of the near field light.

(d) Reproducing Example

Next, explained is a reproducing example using the super resolution technique of the present invention.

First, the construction of an optical recording medium is briefly described. $Pr_{1-x}Ca_xMn_{1+y}O_3$ was formed in a thickness of 20 nm as a mask layer on a sapphire single crystal transparent substrate of 2.5 inch diameter (outer diameter: 65 mm, inner diameter: 20 mm, thickness: 0.635 mm). On the top of this mask layer, a $SiO_2$—ZnS film (thickness: 80 nm), a GeSbTe film (thickness: 20 nm) and a $SiO_2$—ZnS film (thickness: 80 nm) were formed as a lower protective layer, a recording layer and an upper protective layer, respectively.

The mask layer presents a Tc of about 80° C., which was confirmed by determining the temperature dependence of the resistivity. The reason the sapphire single crystal transparent substrate was used is that this is a flat and smooth single crystal transparent substrate and has a high thermal conductivity and a high thermal resistance. In addition to that, since it is an oxide single crystal, the sapphire single crystal transparent substrate is suitable for growing the mask layer, which is formed of an oxide similarly, with good crystallinity.

Further, another protective layer may be formed between the substrate and the mask layer and/or a reflection layer may be formed on the upper protective layer.

A device used for evaluation of the above recording medium was so constructed to irradiate the recording medium 9 with a laser beam from the transparent substrate 1 side via a light pickup 10, as shown in FIG. 1. The light pickup 10 was adapted to apply a light beam of 650 nm wavelength having a diameter of 1.1 μm in the track width direction.

The above-described recording medium 9 was irradiated with light using the above light pickup 10. Signals were reproduced from recording bits with varying the output of the light beam.

When the power of the light beam was 1 mW, the amount of detected light was large but cross talk increased. The reason is considered to be that the mask was not formed at the light beam power of 1 mW. As the light beam power was increased, the amount of detected light dropped abruptly at 1.2 mW. That is, it is considered that the mask was formed. Because a signal itself was not detected at that time, it is considered that the aperture was not formed yet. Further, when the power was increased to 1.5 mW, the amount of detected light and the signal volume both increased. It is considered that the temperature was raised to Tc or higher at the central part in the light spot and the aperture began to form. The amount of detected light and the signal volume increased in proportion to the light beam power up to 2 mW. It was confirmed that the level of noise was low and the increase in the signal volume contributed to increase of the S/N.

After the light beam power exceeded 2 mW, the cross talk was observed to increase, and as the light beam power was further increased, the cross talk became as large as when the light beam was applied at the power of 1 mW. It is considered that the temperature was raised to Tc or higher in the entire area in the light spot and the mask disappeared.

Subsequently, by use of a recording medium having the same construction except that the lower protective layer was thinned to 15 nm so that the thickness from the mask layer to the recording layer was thin enough for the near field light to reach the recording layer, the near field light reproducing of a recording bit of 100 nm size was tested.

The amount of detected light dropped abruptly at a light beam power of 1.2 mW and the mask was formed. Then the light beam power was increased. At 1.5 mW, the signals began to be detected with increase in the amount of detected light. When the light beam power was further increased, it was confirmed that the signal volume rose abruptly at 1.6 mW to 1.8 mW. At 1.8 mW or more, the cross talk increased, and at 2 mW, the detection of signals became impossible. That showed that the diameter of the aperture increased with increase in the light beam power and when the annular low-resistivity region as a mask became of a certain size, the signal volume increased abruptly. It is considered that the annular low-resistivity region amplified the near field light.

A drop in the intensity of signals or increase in jitter was not observed with repeated reproduction. It was confirmed that there were no problems of degradation by the reproducing process or a repetition characteristic.

As detailed above, the present invention enables the reproduction of signals from bits smaller than the light spot with good S/N and good reliability, and realizes an optical recording medium allowing high-density recording and reproduction without reducing the size of the light spot since signals can be amplified even when the near field light is utilized.

In addition, a semiconductor laser with a wavelength of 650 nm is used here as a light source, but the light source is not limited thereto. With use of light sources of 780 nm, 635 nm and 400 nm, the aperture and the mask are also formed and high-density records can be reproduced.

According to the present invention, since the light transmittance of the mask layer is decreased by light irradiation and is increased by heating, it is possible to form, on the mask layer, a region with a low light transmittance to surround a region with a high light transmittance by adjustment of the amount of applied light.

Also, by setting the amount of light in the light spot formed on the recording medium to or over the threshold light amount at which the mask layer transits from an insulator to a metal and setting the temperature at the central portion in the light spot to or over the threshold temperature Tc of the mask layer, it is possible to form the aperture and the mask in the light spot in self-alignment and therefore reproduce signals from bits smaller than the light spot without cross talk.

Further, by decreasing the reflectance of the mask formed at the peripheral part in the light spot, it is possible to reduce noise resulting from transmitted light and reflected light from the mask part.

Also, because the mask layer has threshold values for changes in the light transmittance and in the resistivity, the aperture and the mask are formed abruptly.

Further, since the changes in the light transmittance and in the resistivity of the mask layer are induced by the metal-to-insulator transition, the aperture is formed quickly enough and an optical recording medium with good reliability can be obtained.

Also, because the mask part is formed as an annular low-resistivity region by raising the resistivity at the central part in the light spot and lowering the resistivity at the peripheral part in the light spot, it is possible to amplify the near field light generated via the aperture at the central part in the light spot and realize higher-density recording and reproduction.

What is claimed is:

1. An optical recording medium comprising a recording layer and a mask layer on a substrate, wherein the mask layer is formed of a material whose light transmittance, at a first transition, is decreased by light irradiation to provide a local annular mask region of low light transmittance when light irradiation is between a first threshold light intensity and a second threshold light intensity and, at a second transition, is increased by heating said material beyond a critical temperature that corresponds to said second threshold light intensity, wherein said first transition occurs in a light or optical mode and said second transition occurs in a heat or thermal mode;

wherein said mask region has a light transmissivity and electrical resistivity that is less than a light transmissivity and electrical resistivity of regions of said mask layer adjacent to said mask region.

2. An optical recording medium according to claim 1, wherein the mask layer has a threshold light transmittance with respect to the amount of light applied to the mask layer and the light transmittance at a central part in a light spot formed by the applied light is set to be higher than the light transmittance at a peripheral part in the light spot and lower than the light transmittance at a part of the mask layer which is not irradiated with light.

3. An optical recording medium according to claim 2, wherein a change in the light transmittance of the mask layer is induced by a metal-to-insulator transition.

4. An optical recording medium according to claim 1, wherein the mask layer has a threshold electrical resistivity with respect to the amount of light applied to the mask layer and the electrical resistivity at a central part in a light spot formed by the applied light is set to be higher than the electrical resistivity at a peripheral part in the light spot and lower than the electrical resistivity at a part of the mask layer which is not irradiated with light.

5. An optical recording medium according to claim 4, wherein a change in electrical resistivity of the mask layer is induced by a metal-to-insulator transition.

6. An optical recording medium according to claim 1, wherein the mask layer is formed of $Pr_{1-X}Ca_xMn_{1+Y}O_3$ wherein X is 0.3 to 0.5 and Y is 0.0 to 0.1, Sr-doped $Pr_{1-X}Ca_xMn_{1+Y}O_3$ wherein X is 0.3 to 0.5 and Y is 0.0 to 0.1 or $La_{1-X}Ca_xMn_{1+Y}O_3$ wherein X is 0.6 to 0.7 and Y is 0.0 to 0.1.

7. An optical recording medium as recited in claim 1, wherein said first threshold light intensity corresponds to a light intensity at which the material of said mask layer undergoes a first phase change from an insulator to a metal and said second threshold light intensity and said critical temperature correspond to a light intensity and transition temperature, respectively, at which the material of said mask undergoes a second phase change from a metal to an insulator.

8. A reproducing method for an optical recording medium comprising, when information is reproduced with irradiating with light an optical recording medium provided with a recording layer and a mask layer on a substrate, the mask layer having a light transmittance which, in a first transition, is decreased by light irradiation and, in a second transition, is increased by heating, setting the amount of light in a light spot formed by light applied to this mask layer at the first transition to or above a threshold amount of light at which the mask layer transits from an insulator to a metal and setting the temperature at a central part in the light spot at the second transition to or above a threshold temperature at which the mask layer transits from a metal to an insulator wherein said first transition occurs in a light or optical mode and said second transition occurs in a heat or thermal mode.

9. A reproducing method for an optical recording medium comprising, when information is reproduced with irradiating with near field light an optical recording medium provided with a recording layer and a mask layer on a substrate, the mask layer having a light transmittance which, a first transition, is decreased by light irradiation in a light or optical mode and, in a second transition, is increased by heating in a heat or thermal mode, enhancing the near filed light generated via an aperture at a central part of a light spot by means of an annular region having low electrical resistivity formed around the aperture wherein said first transition occurs in a light or optical mode and said second transition occurs in a heat or thermal mode.

10. An optical recording medium comprising a recording layer and a mask layer on a substrate, wherein the mask layer is formed of a material whose light transmittance is decreased by light irradiation and is increased by heating, wherein the mask layer is formed of $Pr_{1-X}Ca_xMn_{1+Y}O_3$ wherein X is 0.3 to 0.5 and Y is 0.0 to 0.1, Sr-doped $Pr_{1-X}Ca_xMn_{1+Y}O_3$ wherein X is 0.3 to 0.5 and Y is 0.0 to 0.1 or $La_{1-X}Ca_xMn_{1+Y}O_3$ wherein X is 0.6 to 0.7 and Y is 0.0 to 0.1.

11. An optical recording medium according to claim 10, wherein the mask layer has a threshold light transmittance with respect to the amount of light applied to the mask layer and the light transmittance at a central part in a light spot formed by the applied light is set to be higher than the light transmittance at a peripheral part in the light spot and lower than the light transmittance at a part of the mask layer which is not irradiated with light.

12. An optical recording medium according to claim 11, wherein a change in the light transmittance of the mask layer is induced by a metal-to-insulator transition.

13. An optical recording medium according to claim 11, wherein a change in electrical resistivity of the mask layer is induced by a metal-to-insulator transition.

14. An optical recording medium according to claim 10, wherein the mask layer has a threshold electrical resistivity with respect to the amount of light applied to the mask layer and the electrical resistivity at a central part in a light spot formed by the applied light is set to be higher than the electrical resistivity at a peripheral part in the light spot and lower than the electrical resistivity at a part of the mask layer which is not irradiated with light.

15. A method for reproducing information onto an optical recording medium, said medium comprising a recording layer and a high light transmittance mask layer on a substrate, the method comprising the steps:

irradiating the mask layer of said optical recording medium with light;

setting the amount of light in a light spot formed by light applied to said mask layer at a first transition to or above a first threshold amount of light at which the mask layer transits from an insulator to a metal, but less than a second threshold amount of light at which the mask layer transits from a metal to an insulator, to provide an annular region in the mask layer having an electrical resistivity and light transmissivity that are less than an electrical resistivity and light transmissivity, respectively, of regions adjacent to said annular region and setting the temperature at a central part in the light spot at a second transition to or above a threshold temperature corresponding to said second threshold amount of light at which the mask layer transits from a metal to an insulator wherein said first transition occurs in a light or optical mode and said second transition occurs in a heat or thermal mode.

16. The method as recited in claim 15, further comprising the step of setting the amount of light in a light spot so that light transmittance is decreased by light irradiation between a first threshold light intensity and a second threshold light intensity and increased by heating beyond a critical temperature that corresponds to said second threshold light intensity.

17. The method as recited in claim 15, wherein the step of setting the temperature at a central part in the light spot comprises setting the amount of light in said light spot so that said temperature at the central part is sufficiently high to provide an aperture through the mask layer.

18. The method as recited in claim 15, wherein the step of setting the amount of light in a light spot comprises setting the amount of light so that the light transmittance at a peripheral part in said light spot is sufficiently low to provide a mask between the central part and parts of the mask layer that are not irradiated.

19. A method for reproducing information onto an optical recording medium, said medium comprising a recording layer and a high light transmittance mask layer on a substrate, wherein the mask layer has a first transition in which light transmittance is decreased by light irradiation in a light or optical mode and a second transition in which light transmittance is increased by heating in a heat or thermal mode, the method comprising the steps:

irradiating the mask layer of said recording medium with near field light; and enhancing the near field light generated via an aperture at a central part of a light spot by means of an annular region having an electrical resistivity and light transmissivity that are formed around the aperture, wherein the electrical resistivity and light transmissivity of the annular region are less than the electrical resistivity and light transmissivity of regions adjacent to said annular region.

20. The method as recited in claim 19, wherein the step of irradiating the mask layer further comprises irradiating the mask layer having a light transmittance which is decreased by light irradiation and increased by heating.

21. An optical recording medium comprising a recording layer and a mask layer on a substrate, wherein the mask layer is formed of a material whose light transmittance, at a first transition, is decreased by light irradiation to provide a local annular mask region of low light transmittance when light irradiation is between a first threshold light intensity and a second threshold light intensity and, at a second transition, is increased by heating said material beyond a critical temperature that corresponds to said second threshold light intensity, wherein the first threshold light intensity at the first transition corresponds to an intensity at which the mask region undergoes a phase change from an insulator to a metal that occurs in a light or optical mode and the second threshold light intensity at the second transition corresponds to an intensity at which the mask region undergoes a phase change from a metal back to an insulator that occurs in a heat or thermal mode.

22. An optical recording medium comprising a recording layer and a mask layer on a substrate, wherein the mask layer is formed of a material whose light transmittance, in a first transition, is decreased by light irradiation to provide a local annular mask region of low light transmittance when light irradiation is between a first threshold light intensity and a second threshold light intensity and, in a second transition, is increased by heating said material beyond a critical temperature that corresponds to said second threshold light intensity, wherein said first transition occurs in a light or optical mode and said second transition occurs in a heat or thermal mode;

wherein said mask region has a light transmissivity and electrical resistivity that is less than a light transmissivity and electrical resistivity of regions of said mask layer adjacent to said mask region, and wherein the mask layer material is an oxide of perovskite.

* * * * *